United States Patent
Gile et al.

(10) Patent No.: US 7,543,231 B1
(45) Date of Patent: Jun. 2, 2009

(54) SYSTEMS, METHODS AND COMPUTER PROGRAM PRODUCTS FOR PRINTING A DOCUMENT WITH A PORTION OF THE DOCUMENT IN COLOR AND A PORTION OF THE DOCUMENT IN BLACK AND WHITE

(75) Inventors: Kimilee S. Gile, Leominster, MA (US); Elaine I. Kuo, Chelmsford, MA (US); Fang Lu, Billerica, MA (US); Corey S. McCaffrey, Boston, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/112,989

(22) Filed: Apr. 30, 2008

(51) Int. Cl.
*G06F 15/00* (2006.01)
*G06F 17/00* (2006.01)

(52) U.S. Cl. ............... 715/274; 715/275; 715/277; 715/777; 715/809; 715/780; 358/1.9; 358/1.11; 358/2.1; 399/156

(58) Field of Classification Search ........... 715/274, 715/275, 277, 777, 809, 780; 358/1.9, 1.11, 358/2.1; 399/156
See application file for complete search history.

(56) References Cited

U.S. PATENT DOCUMENTS 5,568,248 A * 10/1996 Wagley ............... 399/156
5,649,024 A * 7/1997 Goldsmith ............ 382/170
2003/0184774 A1* 10/2003 Minowa ............... 358/1.9
2004/0012816 A1* 1/2004 Minowa ............... 358/2.1
2006/0114497 A1 6/2006 Anderson et al.
2007/0211265 A1 9/2007 Tanimoto
2008/0068628 A1* 3/2008 Dokuni ............... 358/1.9

FOREIGN PATENT DOCUMENTS

JP  2003211745 A * 7/2003

* cited by examiner

*Primary Examiner*—Doug Hutton
*Assistant Examiner*—Nathan Hillery
(74) *Attorney, Agent, or Firm*—Cantor Colburn LLP; Ayla Lari

(57) ABSTRACT

Systems, methods and computer program products for printing a document. Exemplary embodiments include retrieving a document having text and images, displaying the document on the display, displaying a print menu on the display, displaying a properties menu on the display, displaying a print quality menu on the display, displaying a more color options menu on the display, wherein the more color options menu includes "print images in color" and "print text in color" data fields, printing the document in black and white on the color printer, wherein the text is printed in color in response to receiving a print text in color selection signal, indicative of the selection device pointing at the print text in color data field, wherein the images are printed in color in response to receiving a print images in color selection signal, indicative of the selection device pointing at the print images in color data field.

1 Claim, 12 Drawing Sheets

New York City (pronounced /nˈjuː ˌjɔːrk/) (officially The City of New York) is the most populous city in the United States, with its metropolitan area ranking among the largest urban areas in the world. It has been the largest city in the United States since 1790, and was the country's first capital city and the site of George Washington's inauguration as the first president of the United States. For more than a century, it has been one of the world's major centers of commerce and finance. New York City is rated as an alpha world city for its global influences in media, politics, education, entertainment, arts and fashion. The city is also a major center for foreign affairs, hosting the headquarters of the United Nations.

FIG. 9

New York City (pronounced /nɪuˣ jɔɹk/) (officially The City of New York) is the most populous city in the United States, with its metropolitan area ranking among the largest urban areas in the world. It has been the largest city in the United States since 1790, and was the country's first capital city and the site of George Washington's Inauguration as the first president of the United States. For more than a century, it has been one of the world's major centers of commerce and finance. New York City is rated as an alpha world city for its global influences in media, politics, education, entertainment, arts and fashion. The city is also a major center for foreign affairs, hosting the headquarters of the United Nations.

SYSTEMS, METHODS AND COMPUTER PROGRAM PRODUCTS FOR PRINTING A DOCUMENT WITH A PORTION OF THE DOCUMENT IN COLOR AND A PORTION OF THE DOCUMENT IN BLACK AND WHITE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer printing, and particularly to systems, methods and computer program products for printing a document with a portion of the document in color and a portion of the document in black and white.

2. Description of Background

Often times it may be wasteful to print a color document in full color. For example, sometimes it is a waste to print a complete document in color. However, selective color and black and white printing is not an option for users with any existing printing preferences.

SUMMARY OF THE INVENTION

Exemplary embodiments include a method in a computer system having a graphical user interface including a display, a selection device and a color printer, the method for printing a document with a portion of the document in color and a portion of the document in black and white, and including retrieving the document having text and images, displaying the document on the display, receiving a first print selection signal indicative of the selection device selecting to print the document, in response to the first print selection signal, displaying a print menu on the display, receiving a color printer selection signal indicative of the selection device pointing at a color printer selection from a list of printers on the print menu, receiving a properties selection signal indicative of the selection device pointing at a properties button on the print menu, in response to the properties selection signal, displaying a properties menu on the display, receiving a print quality tab selection signal indicative of the selection device pointing at a print quality tab on the properties menu, in response to the print quality tab selection signal, displaying a print quality menu on the display, receiving a more color options selection signal indicative of the selection device pointing at a more color options button on the print quality tab menu, in response to the more color options selection signal, displaying a more color options menu on the display, wherein the more color options menu includes a "print images in color" data field and a "print text in color" data field, receiving a second print selection signal indicative of the selection device pointing to a print button for printing the document and in response to receiving the second print selection signal, printing the document in black and white on the color printer, wherein the text is printed in color in response to receiving a print text in color selection signal, indicative of the selection device pointing at the print text in color data field, wherein the images are printed in color in response to receiving a print images in color selection signal, indicative of the selection device pointing at the print images in color data field.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which includes the ability to print a portion of a document in color and the remainder of the document in black and white.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In exemplary embodiments, the systems and methods described herein provide a new print preference that allows printing one document with a portion of it to be in color and the rest in black and white. In exemplary embodiments, the systems and methods described herein implement existing printer preferences and allow users to have the option to decide whether the user wants to print images in the document in color but the text in black and white, or the image in black and white ands the text in color, or some combination thereof. In exemplary embodiments, the color portions of the document that the user selects to print in black and white can be printed in a gray scale instead of color. In exemplary embodiments, when the user wants to print a document with images, the user can make the above-described selections from a printing preferences menu as described herein. In exemplary embodiments, the user can choose to print the text in color and leave the images in black and white. For example, if the document has been revised through different versions or an email thread has a few replies by different people using a different font color, then this option can be implemented.

Figure 1:
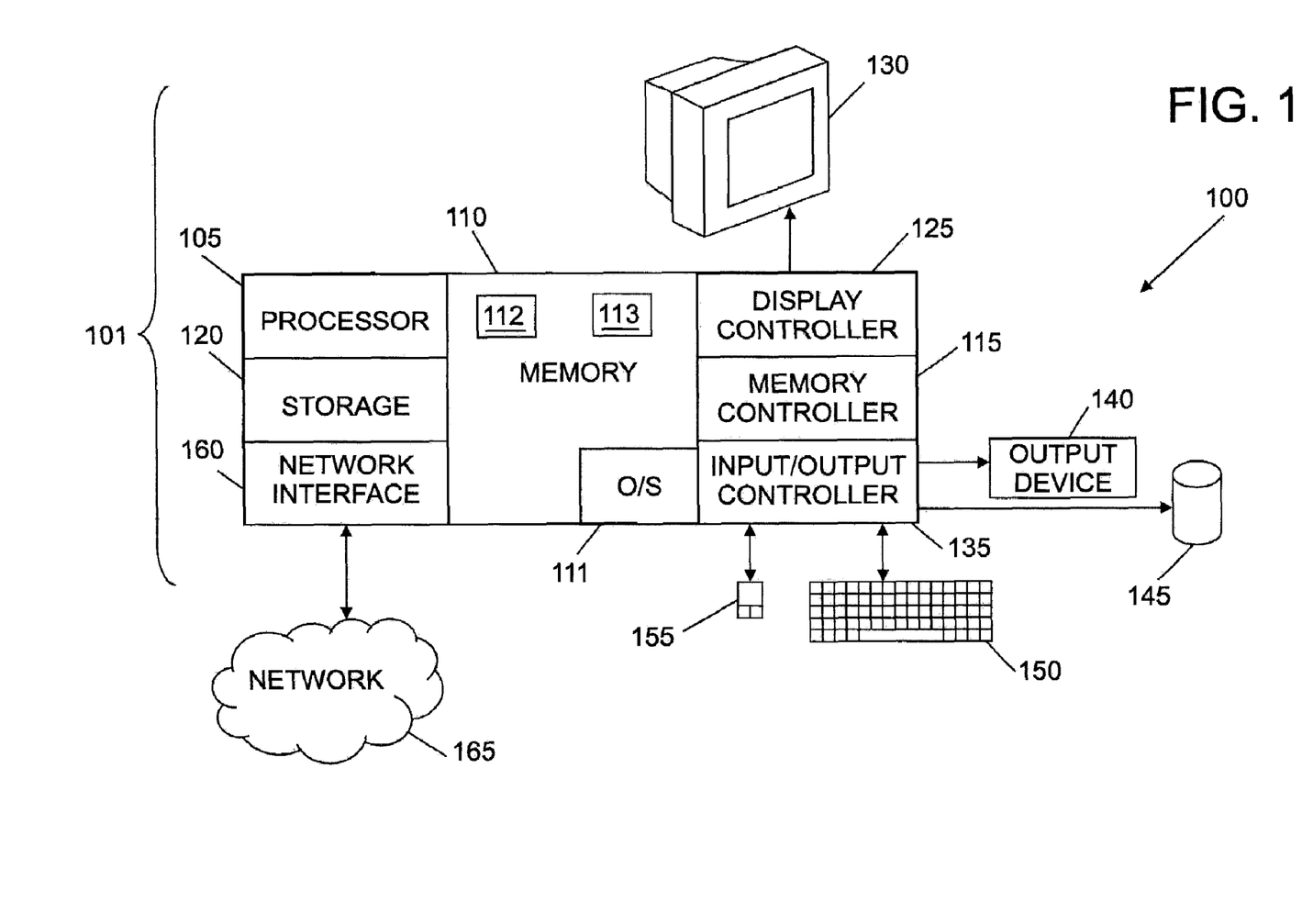
FIG. 1 illustrates an exemplary embodiment of a system for printing a document with a portion in color and a portion in black and white.

FIG. 1 illustrates an exemplary embodiment of a system 100 for printing a document with a portion in color and a portion in black and white. The methods described herein can be implemented in software (e.g., firmware), hardware, or a combination thereof. In exemplary embodiments, the methods described herein are implemented in microcode, as an executable routine that is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions. It is appreciated that the processor 105 can include a plurality of registers including GPRs, FPRs, scratch registers, etc.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the printing methods described herein in accordance with exemplary embodiments and a suitable operating system (OS) 111. The operating system 111 essentially controls the execution of other computer programs, such the printing systems and methods described herein, and provides scheduling, input-output control, file and data management, memory management, and communication control and related services.

The printing methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the printing methods can be written as an object oriented programming language, which has classes of data and methods, or a procedure programming language, which has routines, subroutines, and/or functions. Regardless, the memory 110 includes a print application algorithm configured to select which print area of a document 113 in the memory 110 should be in color and which print area of the document 113 in the memory 110 should be in black and white as further described herein.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The printing methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The printing methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the printing methods are implemented in hardware, the printing methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
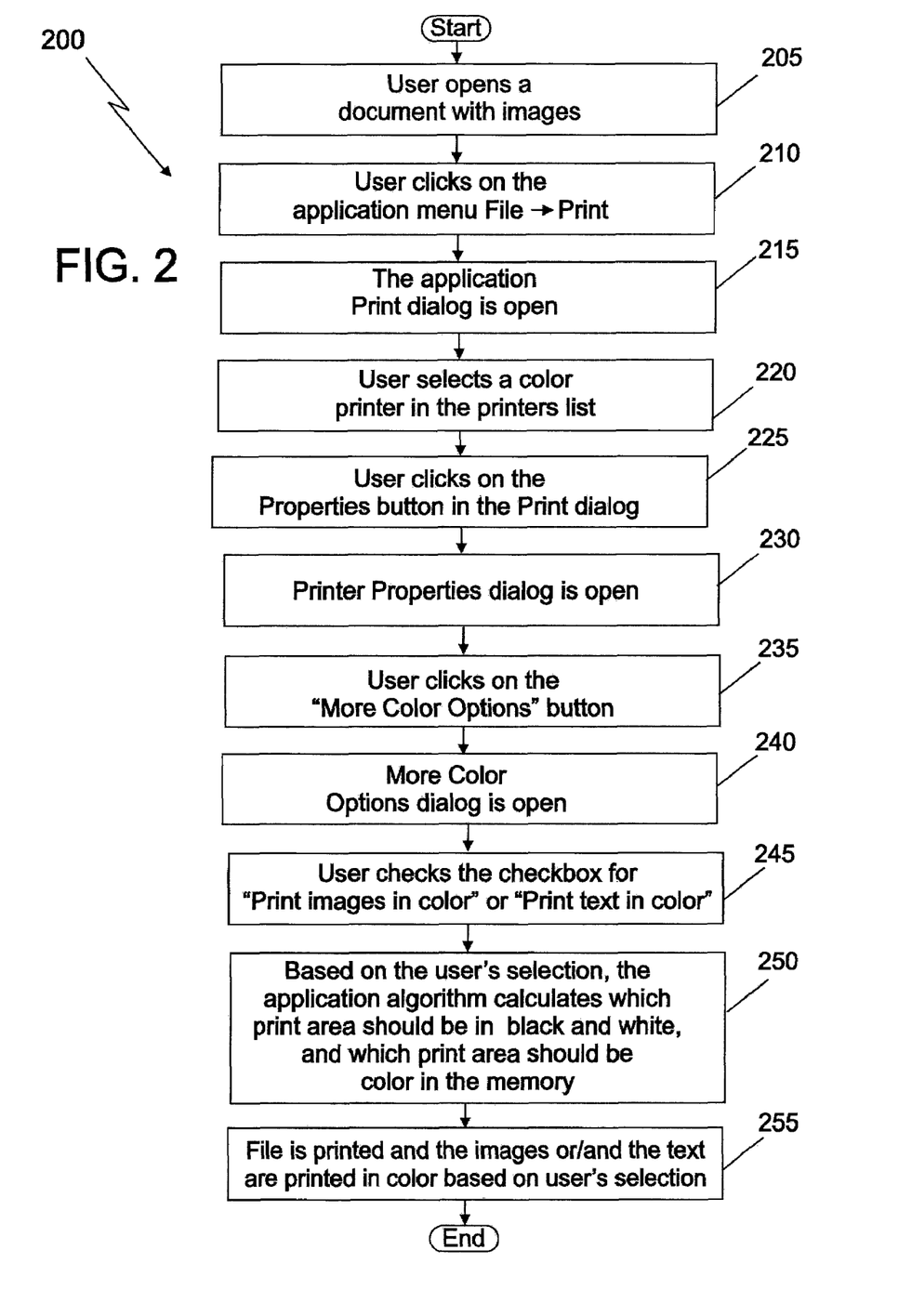
FIG. 2 illustrates a flow chart of a method for printing a document with a portion in color and a portion in black and white in accordance with exemplary embodiments.
Figure 3:
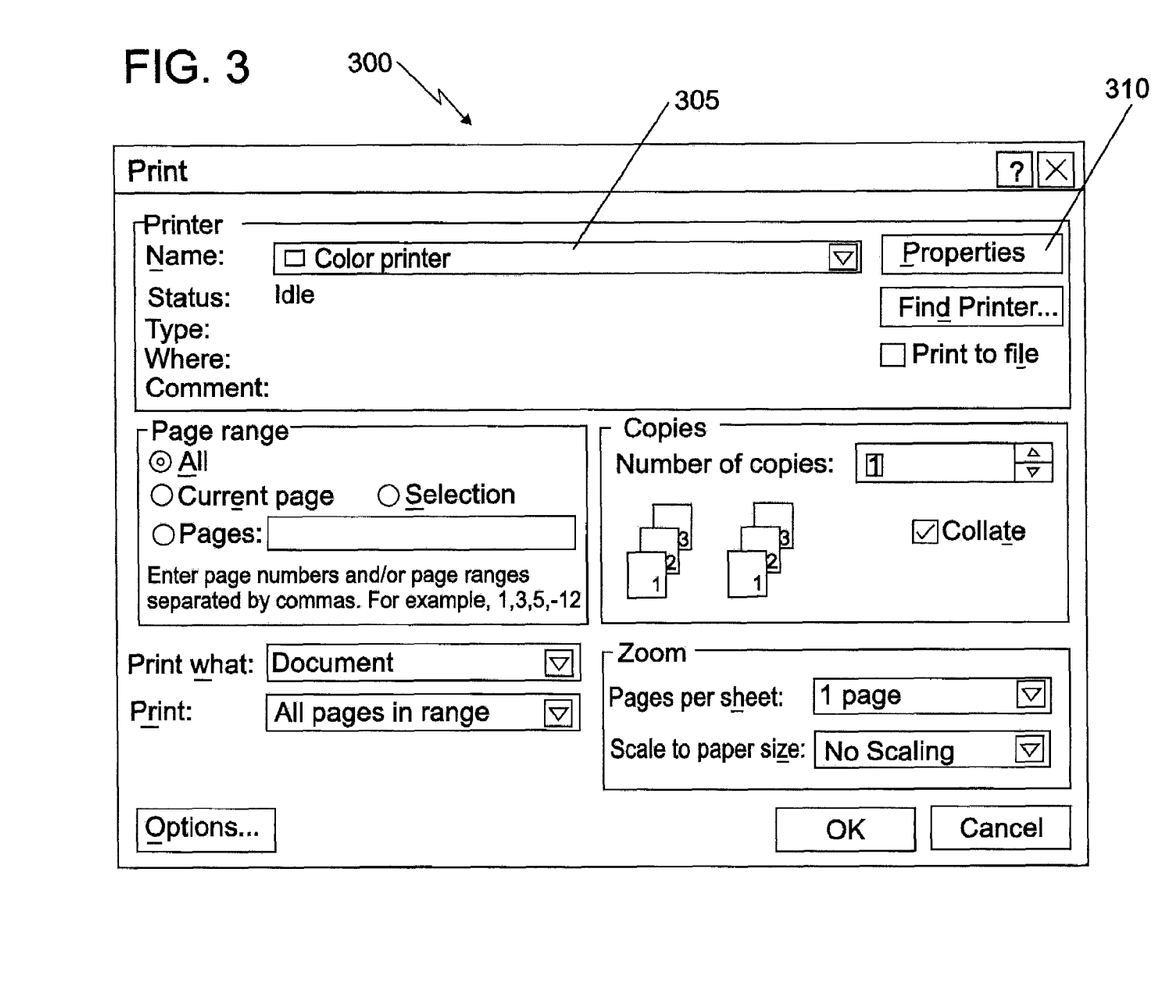
FIG. 3 illustrates a screen shot of a print dialog in accordance with exemplary embodiments.
Figure 4:
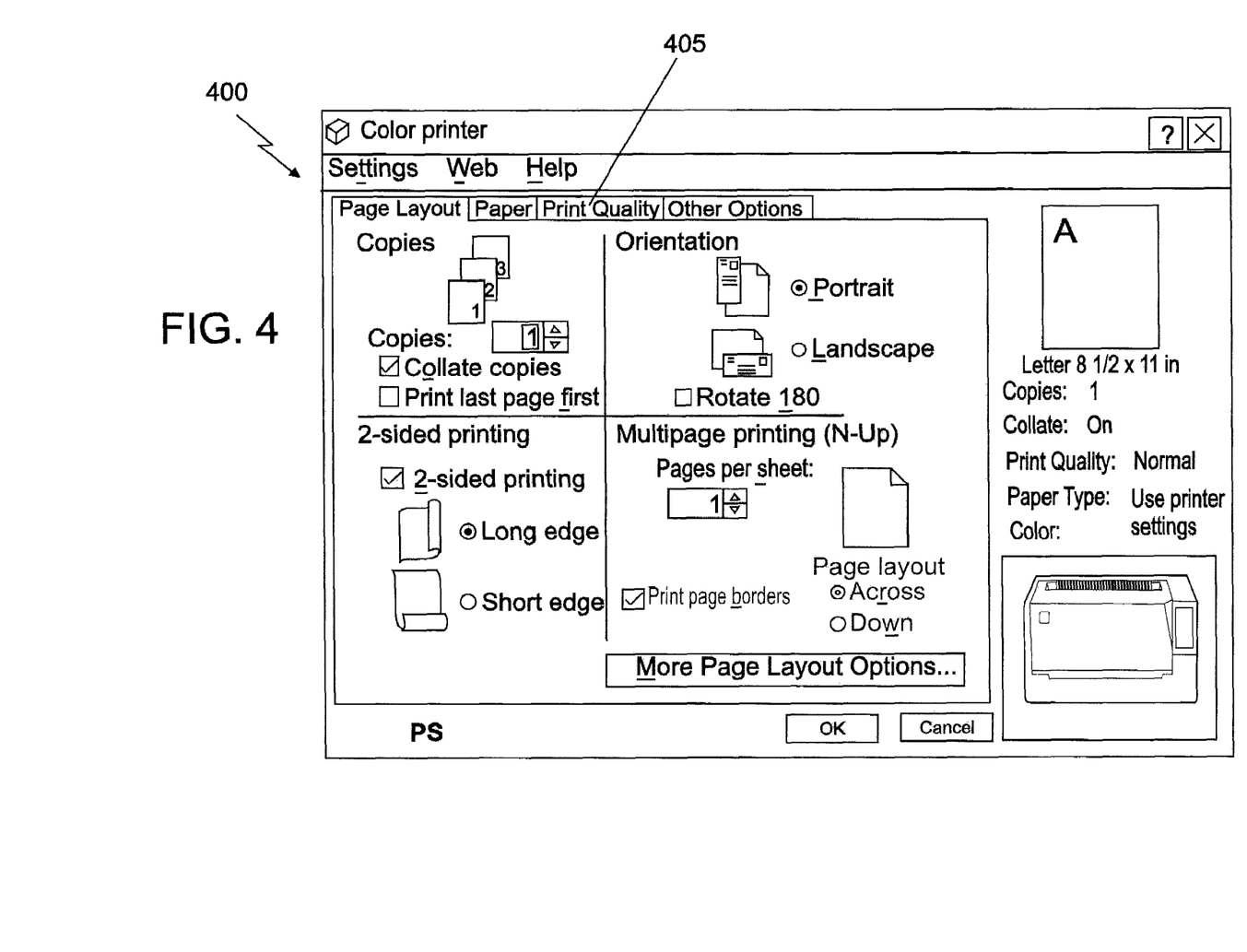
FIG. 4 illustrates a screenshot of a properties dialog in accordance with exemplary embodiments.
Figure 5:
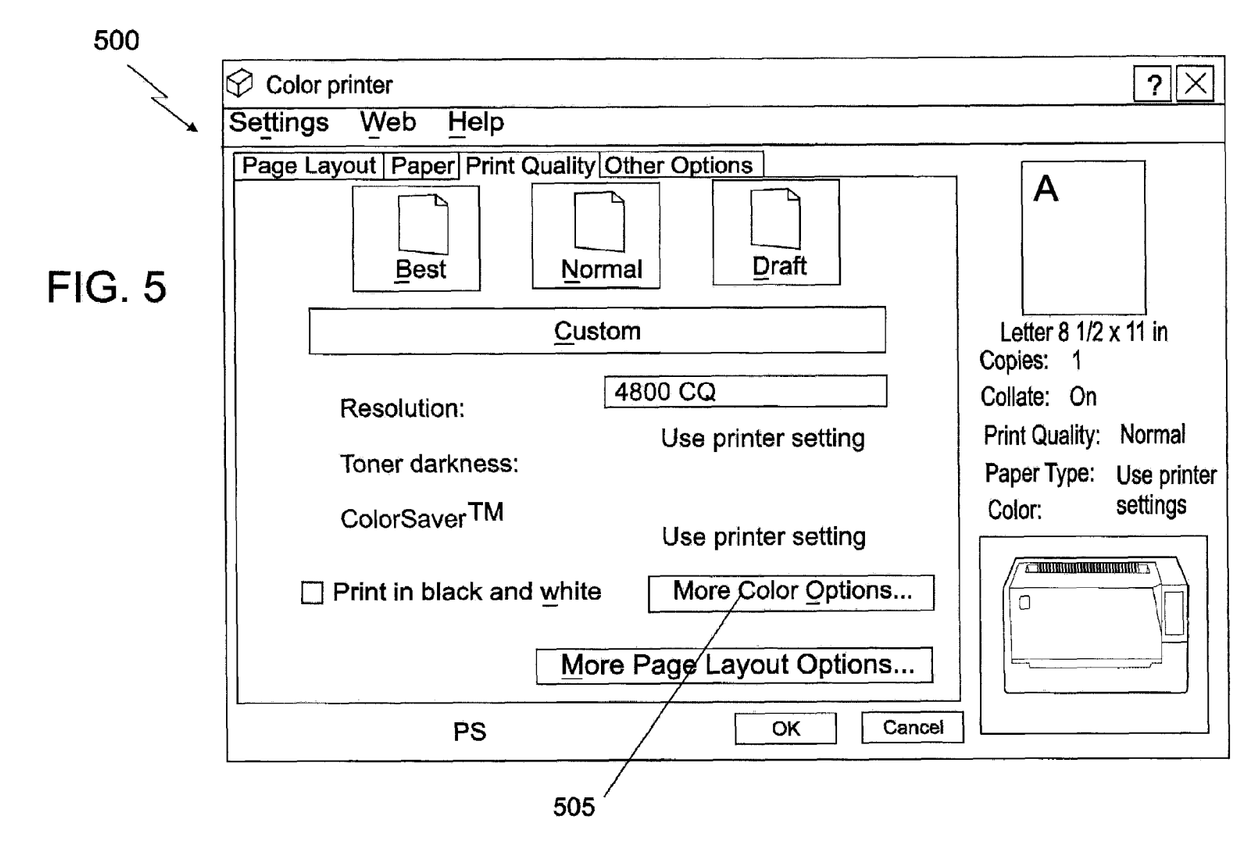
FIG. 5 illustrates a screenshot of a print quality dialog in accordance with exemplary embodiments.
Figure 6:
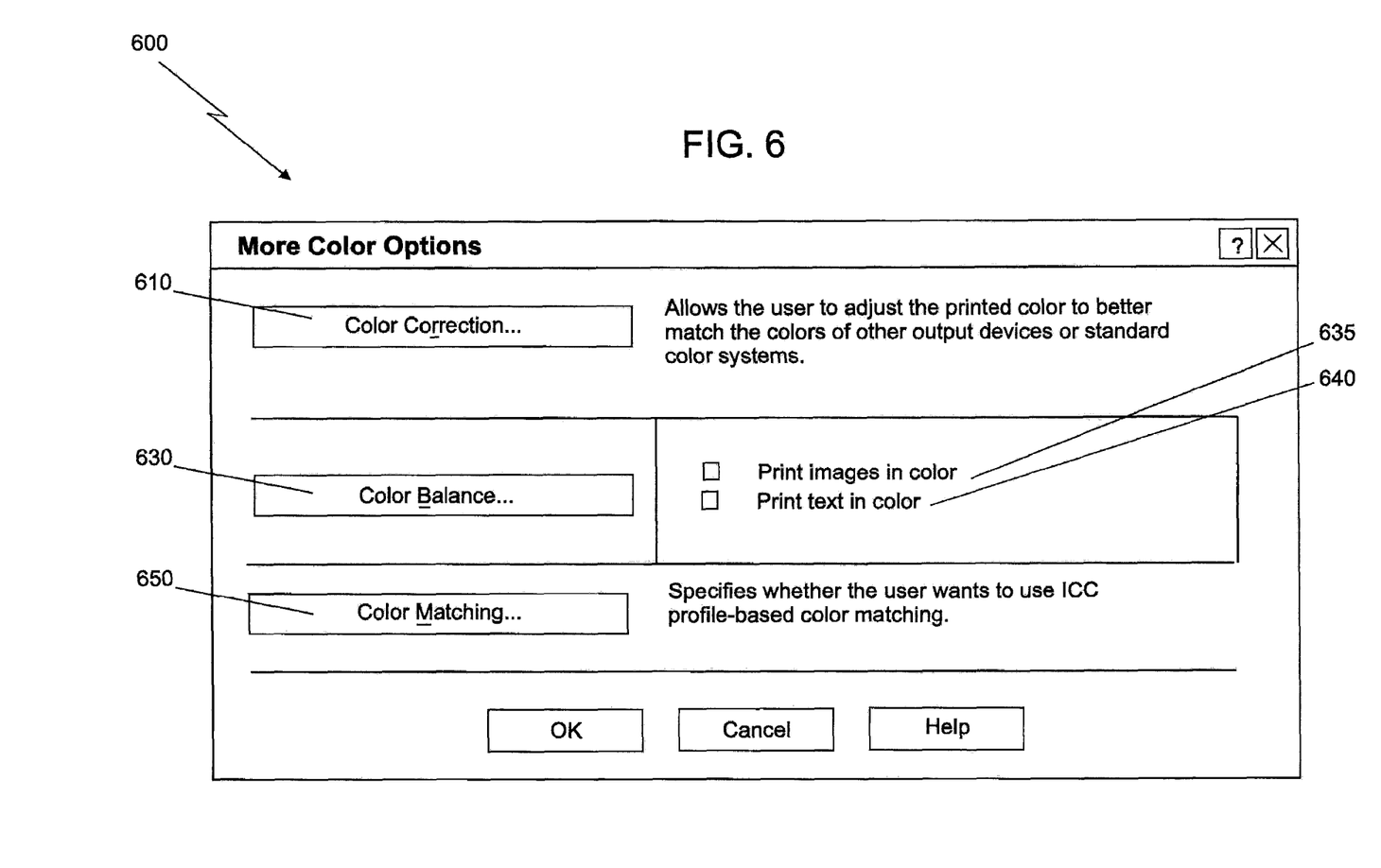
FIG. 6 illustrates a screenshot of a more color options dialog in accordance with exemplary embodiments.
Figure 7:
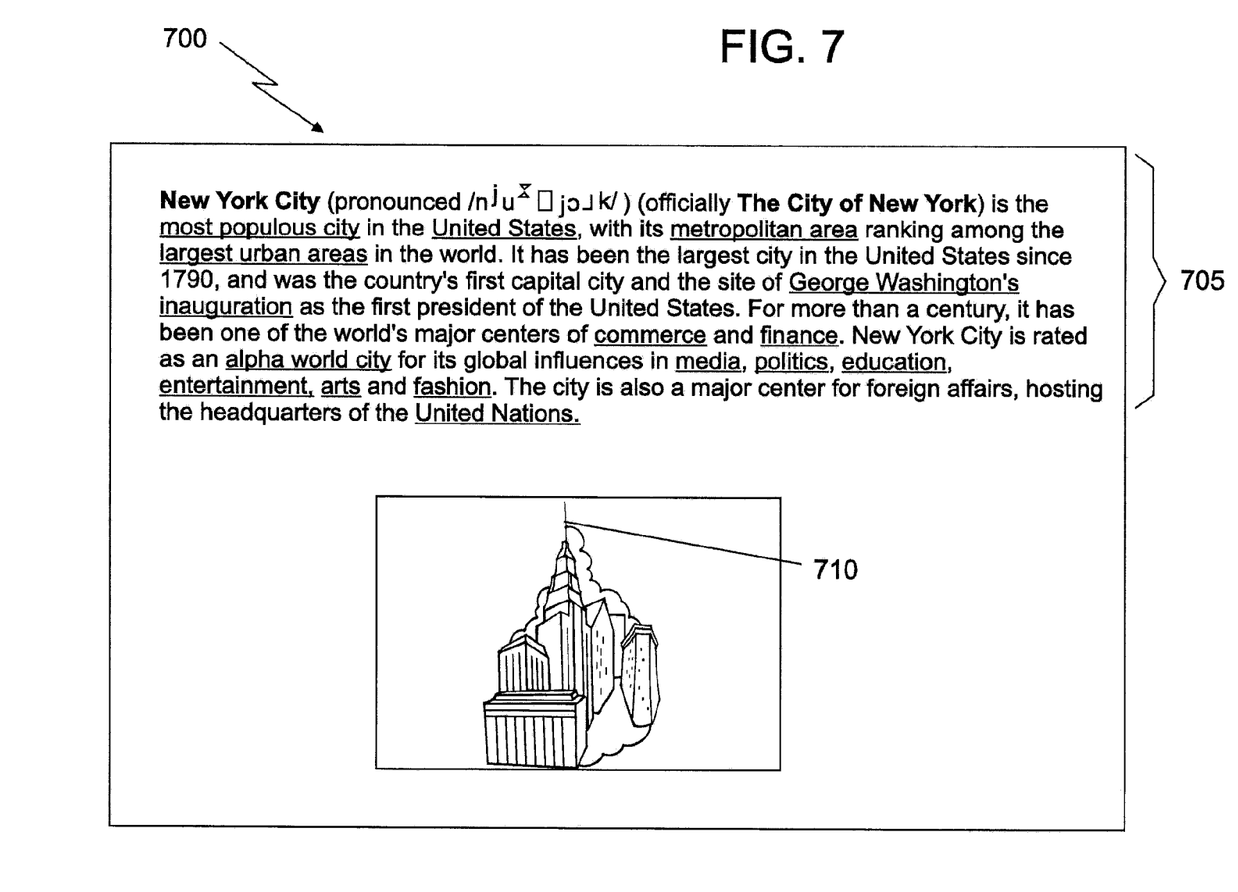
FIG. 7 illustrates a screenshot of print image in accordance with exemplary embodiments.
Figure 8:
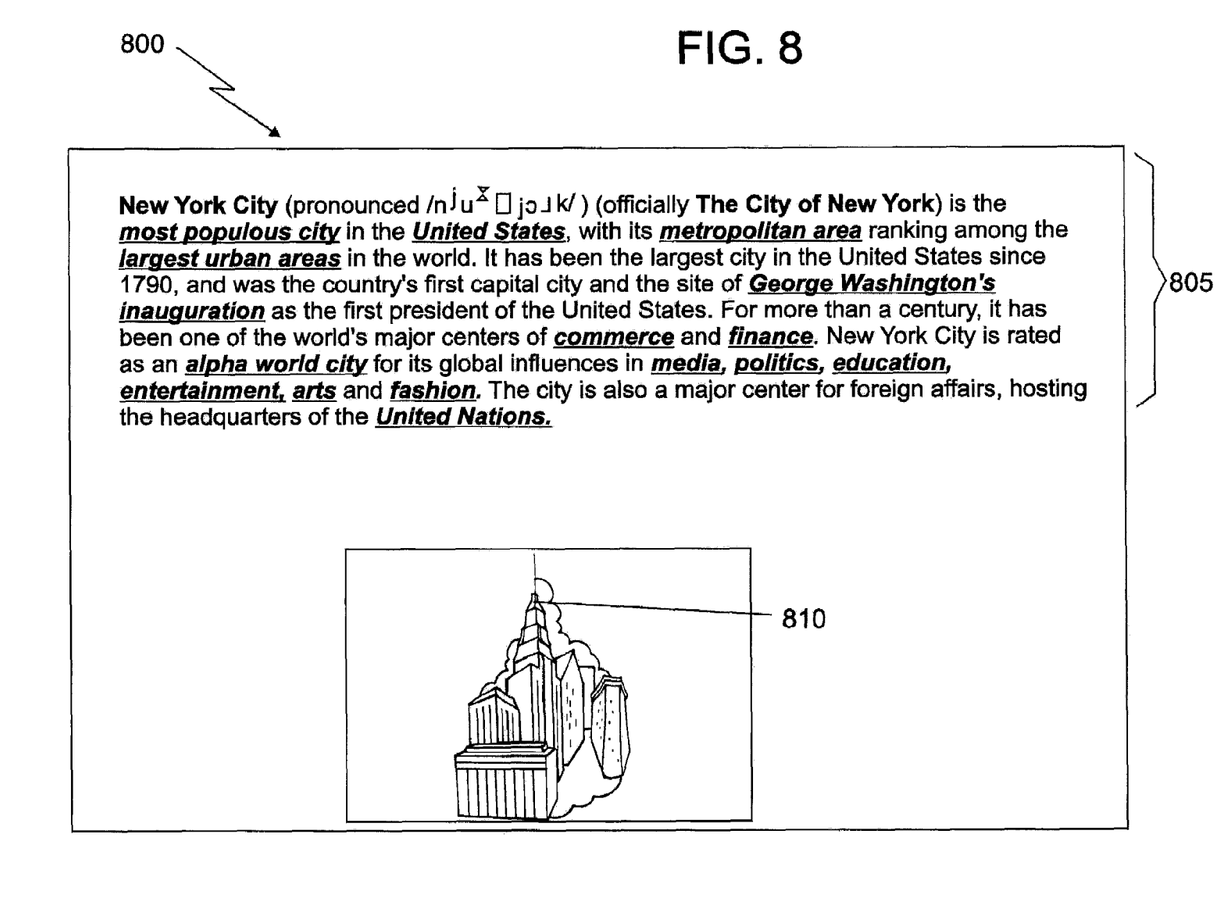
FIG. 8 illustrates a screenshot of a print image in accordance with exemplary embodiments.
Figure 9:
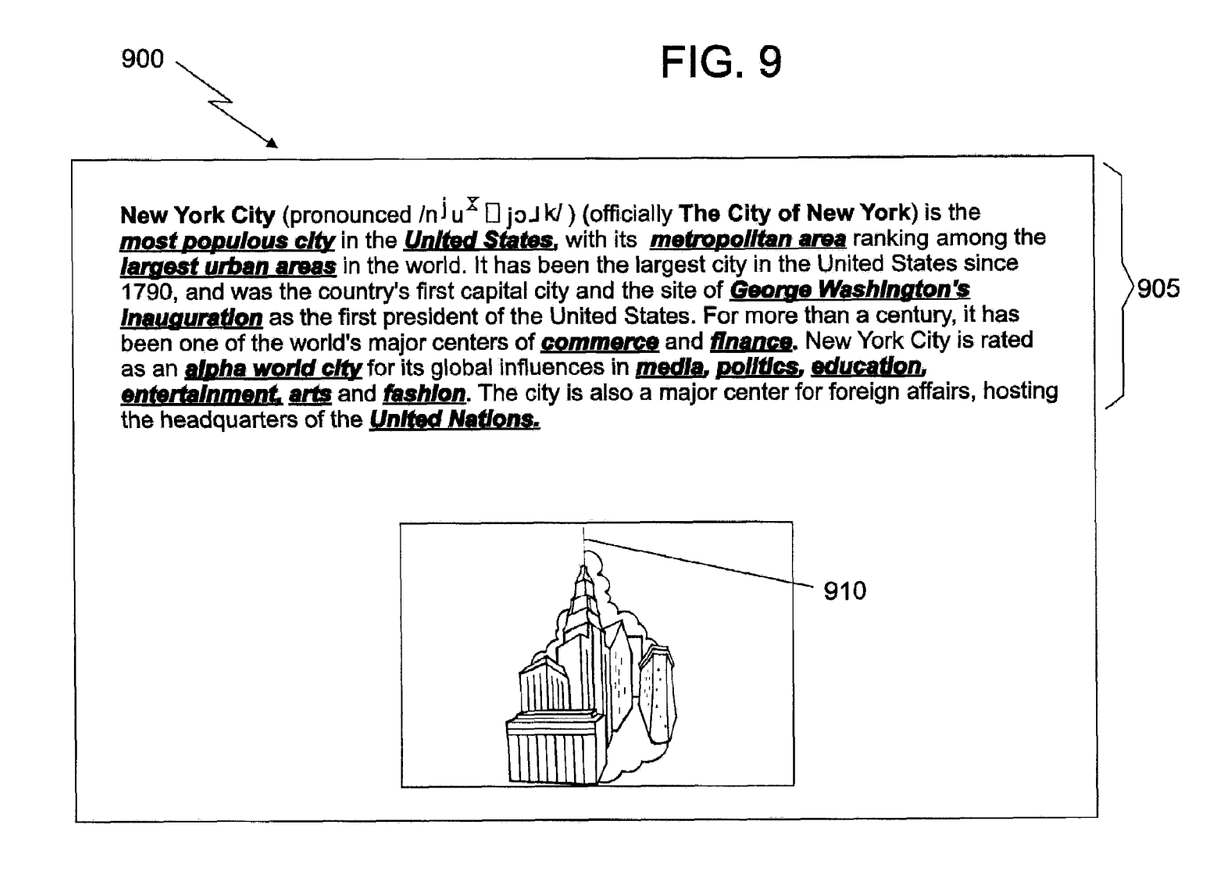
FIG. 9 illustrates a screenshot of a print image in accordance with exemplary embodiments.

FIG. 2 illustrates a flow chart of a method 200 for printing a document with a portion in color and a portion in black and white in accordance with exemplary embodiments. As discussed above, the method 200 describes printing partial color and partial black and white in documents. At block 205, the user opens a document that includes images. Exemplary documents 700, 800, 900 are illustrated in FIGS. 7-9. At step 210, the user can select to print the document and select the application menu File, print. At block 215, the print dialog is launched. FIG. 3 illustrates a screen shot 300 of a print dialog in accordance with exemplary embodiments. At block 220, the user can select a color printer in the printers list 305 in the dialog. As is appreciated in the description herein, the user must select a color printer from the printers list 305 in order to access the further exemplary color options as described herein. At block 225, the user selects the properties button 310 from the dialog. At block 230, the method 200 launches the properties dialog. FIG. 4 illustrates a screenshot 400 of a properties dialog in accordance with exemplary embodiments. At block 235, the user can select the Print Quality tab 405, which allows the user to select the "More Color Options" button 505 as illustrated in FIG. 5 that illustrates a screenshot 500 of a print quality dialog in accordance with exemplary embodiments. At block 240, the "More Color Options" dialog is opened. FIG. 6 illustrates a screenshot 600 of a more color options dialog in accordance with exemplary embodiments. In exemplary embodiments, the dialog includes a color correction button 610, a color balance button 630, and a color matching button 650. It is appreciated that other buttons are included in the several dialogs described herein, which are known in the art such as "OK", "CANCEL" and "HELP". In exemplary embodiments, the dialog further includes a "Print Images In Color" data field 635 and a "Print Text In Color" data field 640. In exemplary embodiments, the user can check the "Print Images In Color" data field 635 so that the images in the document are printed in color. In exemplary embodiments, the use can check the "Print Text In Color" data field 640 so that the text in the document is printed in color. In exemplary embodiments, in the final print out, the images and/or text is printed in color based on the user's selection of the data fields 635, 640. As such, at block 246, the user checks the data field (i.e., check box) for the "Print Images In Color" and "Print Text In Color" data fields 635, 640. At block 250, based on the user's selection, the application algorithm calculates which print area of the document should be in black and white and which print area of the document should be in color in the memory 110.

In exemplary embodiments, If user selects the "Print images in color" data field 235 only, then the user obtains a print out as illustrated in FIG. 7 that illustrates a screenshot 700 of print image in accordance with exemplary embodiments, in which the text 705 is in black and white, and the image 710 stays in color. In exemplary embodiments, If the user selects the "Print text in color" data field 640 only, then the user obtains a print out as illustrated in FIG. 8 that illustrates a screenshot 800 of a print image in accordance with exemplary embodiments, in which the text 805 is in color but the 810 images are in black and white. In exemplary embodiments, if the user selects both the "Print images in color" data field 635 and the "Print text in color" data field 640, then the user obtains a print out as illustrated in FIG. 9 that illustrates a screenshot 900 of a print image in accordance with exemplary embodiments, in which both the text 905 and the image 910 are printed in color.

Figure 10:
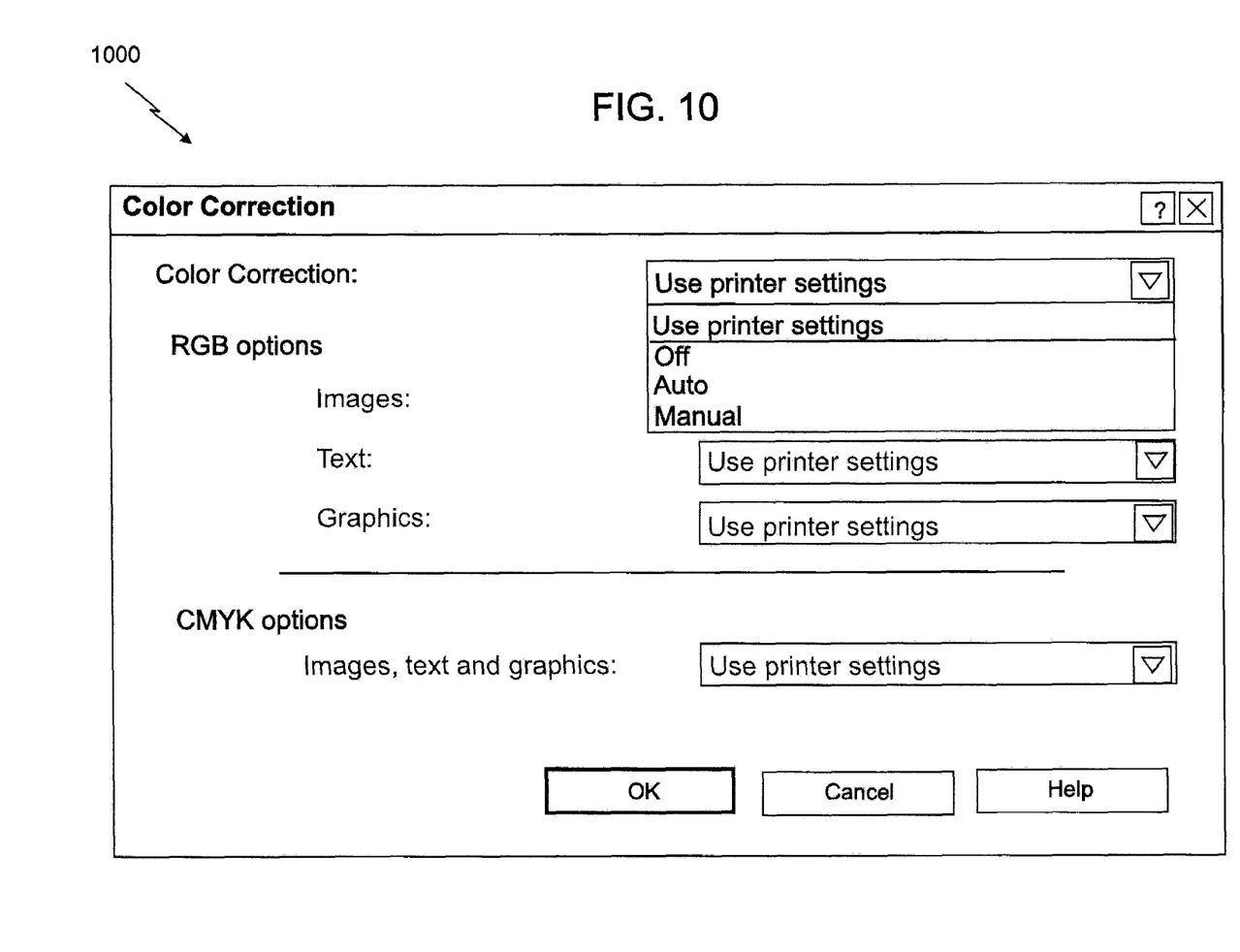
FIG. 10 illustrates a screenshot of a color correction dialog in accordance with exemplary embodiments.
Figure 11:
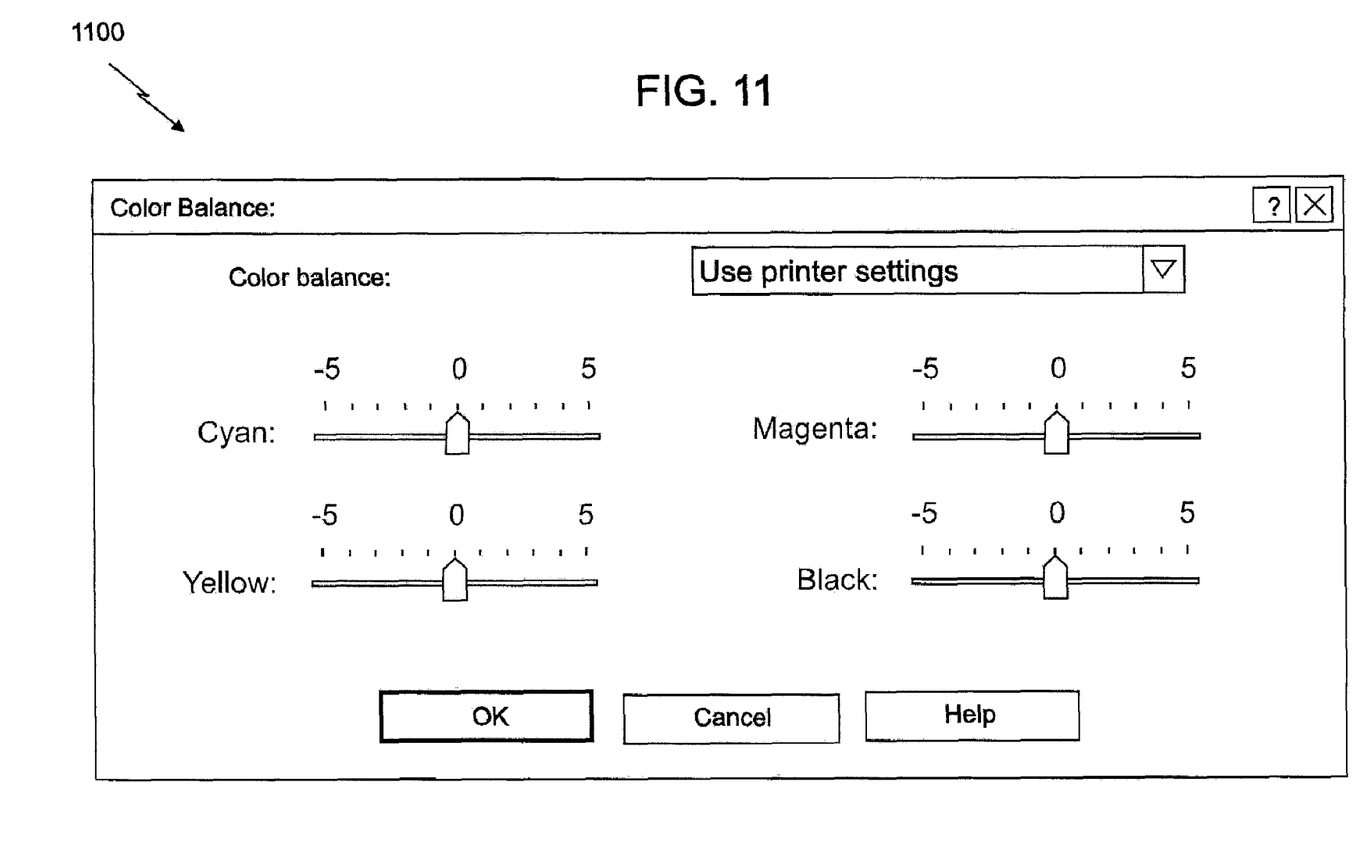
FIG. 11 illustrates a screenshot of a color balancing dialog in accordance with exemplary embodiments.
Figure 12:
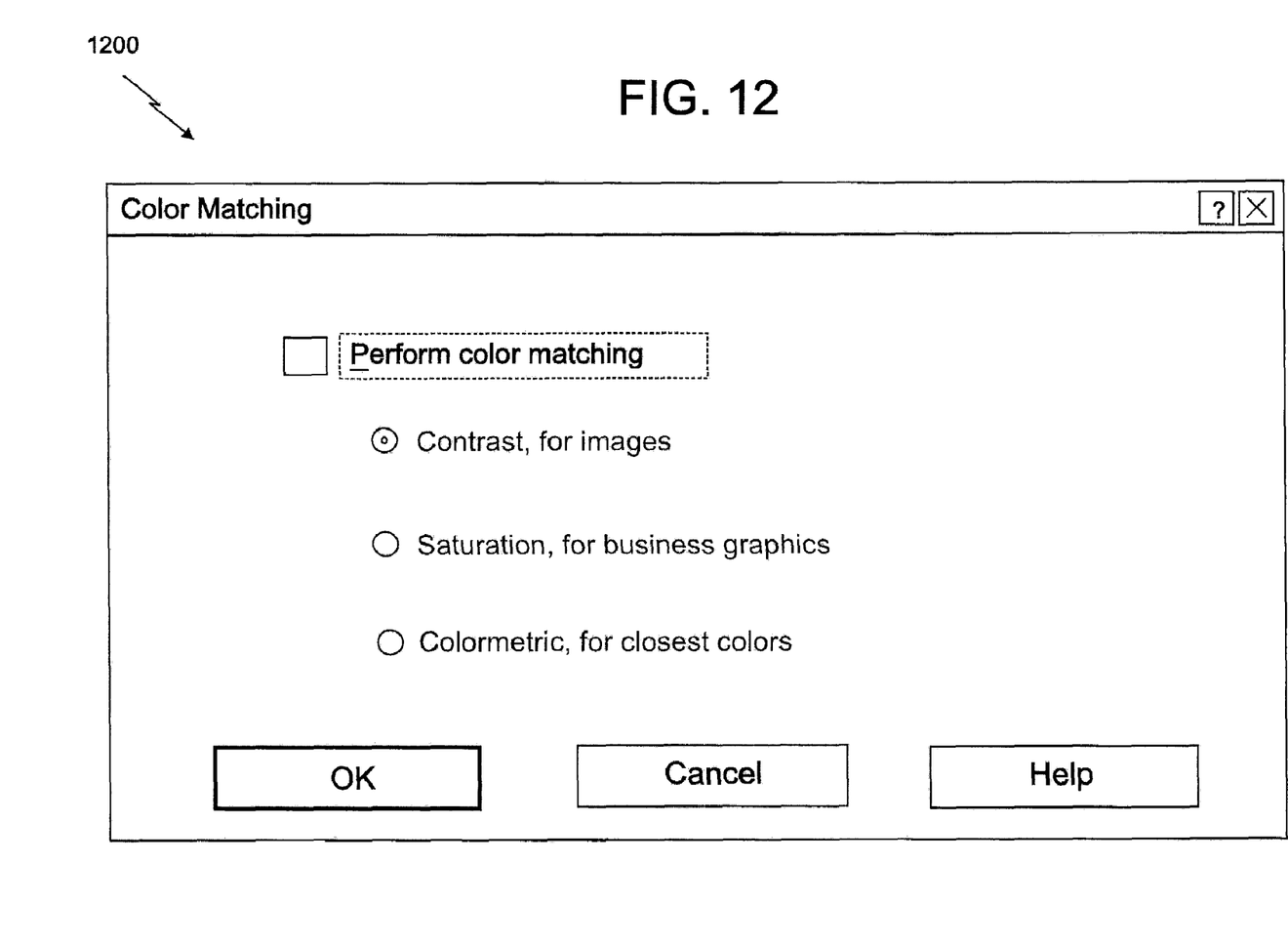
FIG. 12 illustrates a screenshot of a color matching dialog in accordance with exemplary embodiments.

Referring again to FIG. 6, the user can also select the color correction button, which can bring up a default color correction dialog as known in the art. FIG. 10 illustrates a screenshot 1000 of a color correction dialog in accordance with exemplary embodiments. The user can also select the color-balancing button 630, which can bring up a default color balancing dialog as known in the art. FIG. 11 illustrates a screenshot 1100 of a color-balancing dialog in accordance with exemplary embodiments. The user can also select the color-matching button 650, which can bring up a default color-matching dialog as known in the art. FIG. 12 illustrates a screenshot 1200 of a color matching dialog in accordance with exemplary embodiments.

Referring again to FIG. 2, finally, at block 255, the user can print the document in which the file is printed and the images and/or text are printed in color based on the user's selections as described herein.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system having a graphical user interface including a display, a selection device and a color printer, a method for printing a document with a portion of the document in color and a portion of the document in black and white, the method consisting of:

retrieving the document having images and text using at least two different font colors;

displaying the document on the display;

receiving a first print selection signal indicating that the selection device has selected to print the document;

in response to the first print selection signal, displaying a print menu on the display;

receiving a color printer selection signal indicating that the selection device has clicked on a color printer for selection from a list of printers on the print menu;

receiving a properties selection signal indicating that the selection device has clicked on a properties button on the print menu;

in response to the properties selection signal, displaying a properties menu on the display;

receiving a print quality tab selection signal indicating that the selection device has clicked on a print quality tab on the properties menu;

in response to the print quality tab selection signal, displaying a print quality menu on the display;

receiving a more color options selection signal indicating that the selection device has clicked on a more color options button on the print quality tab menu;

in response to the more color options selection signal, displaying a more color options menu on the display, the more color options menu including a "print images in color" data field and a "print text in color" data field;

receiving a print in color selection signal indicating that the selection device has clicked either the "print images in color" data field or the "print text in color" data field;

in response to the print in color selection signal, calculating which portion of the document should be printed in black and white and which portion of the document should be printed in color;

receiving a second print selection signal indicating that the selection device has clicked on a print button for printing the document; and in response to receiving the second print selection signal, printing a portion of the document in black and white and a portion of the document in color on the color printer based on the calculation, the portion of the document printed in color indicating which print in color selection signal was received.

* * * * *